United States Patent
Li et al.

(10) Patent No.: US 9,679,486 B2
(45) Date of Patent: Jun. 13, 2017

(54) SYSTEM AND METHOD TO DETECT WHETHER A PARKED VEHICLE IS IN AN ENCLOSED SPACE OR AN OPEN SPACE

(71) Applicant: FORD GLOBAL TECHNOLOGIES, LLC, Dearborn, MI (US)

(72) Inventors: Yonghua Li, Ann Arbor, MI (US); Hai Yu, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 27 days.

(21) Appl. No.: 14/919,828

(22) Filed: Oct. 22, 2015

(65) Prior Publication Data

US 2017/0115398 A1    Apr. 27, 2017

(51) Int. Cl.

| | |
|---|---|
| *G08G 1/14* | (2006.01) |
| *G01S 19/01* | (2010.01) |
| *G01S 19/03* | (2010.01) |
| *G01S 19/06* | (2010.01) |
| *G01S 19/45* | (2010.01) |
| *G01S 19/51* | (2010.01) |
| *G01K 3/04* | (2006.01) |
| *B60L 11/18* | (2006.01) |

(52) U.S. Cl.
CPC .............. *G08G 1/145* (2013.01); *G01K 3/04* (2013.01); *G01S 19/01* (2013.01); *G01S 19/03* (2013.01); *G01S 19/06* (2013.01); *G01S 19/45* (2013.01); *G01S 19/51* (2013.01); *B60L 11/1824* (2013.01); *G08G 1/146* (2013.01); *G08G 1/147* (2013.01); *Y10S 903/903* (2013.01)

(58) Field of Classification Search
CPC ........ G08G 1/145; G08G 1/146; G08G 1/147; G01S 19/01; G01S 19/03; G01S 19/06; G01S 19/45; G01S 19/51; G01K 3/04
See application file for complete search history.

(56) References Cited

U.S. PATENT DOCUMENTS

| 8,963,698 | B2 | 2/2015 | Grossman | |
|---|---|---|---|---|
| 8,972,152 | B2* | 3/2015 | Boesch | F02N 11/0837 701/113 |
| 2010/0171588 | A1* | 7/2010 | Chutorash | G07C 9/00182 340/5.71 |
| 2010/0253491 | A1 | 10/2010 | Grossman | |
| 2011/0071701 | A1 | 3/2011 | Holub et al. | |
| 2011/0163721 | A1* | 7/2011 | Van Wiemeersch | B60R 16/033 320/128 |
| 2012/0158285 | A1* | 6/2012 | Yamazaki | G01C 21/3492 701/410 |
| 2013/0110376 | A1* | 5/2013 | Surnilla | F02D 41/042 701/103 |
| 2013/0218378 | A1* | 8/2013 | Lindemann | G01C 21/3469 701/22 |

(Continued)

FOREIGN PATENT DOCUMENTS

DE         10138621 A1 *  3/2003   ............ B60S 1/0402

*Primary Examiner* — Dale W Hilgendorf
(74) *Attorney, Agent, or Firm* — Carlson, Gaskey & Olds, P.C.

(57) ABSTRACT

An exemplary positioning method for a parked electrified vehicle, includes using an electrified vehicle charging system to compare at least one expected temperature outside a parked vehicle to at least one actual temperature outside the parked vehicle to determine whether the parked vehicle is in an open space or an enclosed space.

20 Claims, 4 Drawing Sheets

(56) References Cited

U.S. PATENT DOCUMENTS

2015/0084779 A1* 3/2015 Saladin ............. G07C 9/00896
340/686.6
2015/0217754 A1* 8/2015 MacNeille ............ B60W 10/26
701/22

* cited by examiner

SYSTEM AND METHOD TO DETECT WHETHER A PARKED VEHICLE IS IN AN ENCLOSED SPACE OR AN OPEN SPACE

TECHNICAL FIELD

This disclosure relates generally to detecting whether a vehicle is in an enclosed space, such as a closed garage, or an open space. More particularly, the disclosure relates to detecting an enclosed space or open space using temperature comparisons.

BACKGROUND

Electrified vehicles generally differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs) and plug-in hybrid electric vehicles (PHEVs).

In many electrified vehicles that incorporate the internal combustion engine, the engine can be used to charge the traction battery. In some examples, the internal combustion engine can be autonomously started to charge the battery.

SUMMARY

A positioning method for a parked electrified vehicle according to an exemplary aspect of the present disclosure includes, among other things, using an electrified vehicle charging system to compare an expected temperature outside a parked vehicle to an actual temperature outside the parked vehicle to determine whether the parked vehicle is in an open space or an enclosed space.

In a further non-limiting embodiment of the foregoing positioning method, the method includes receiving the expected temperature from a weather station.

In a further non-limiting embodiment of the foregoing positioning method. The method includes providing an indication that the vehicle is in an enclosed space if a signal having the at least one expected temperature is not received or has a signal strength below a threshold value.

In a further non-limiting embodiment of any of the foregoing positioning methods, the expected temperature includes a plurality of expected temperatures each taken at different times within a time period, and the actual temperature includes a plurality of actual temperatures each taken at different times with the time period.

In a further non-limiting embodiment of any of the foregoing positioning methods, the positioning method includes using a frequency spectrum analysis when comparing the plurality of expected temperatures to the plurality of actual temperatures.

In a further non-limiting embodiment of any of the foregoing positioning methods, the positioning method includes providing an indication that that the parked vehicle is in open space if a frequency spectrum for the plurality of actual temperatures is varying differently than a frequency spectrum for the plurality of expected temperatures.

In a further non-limiting embodiment of any of the foregoing positioning methods, the positioning method includes providing an indication that the parked vehicle is in open space if an error signal between an first frequency spectrum of the plurality of expected temperatures and a second frequency spectrum of the plurality of actual temperatures varies less than a threshold variation level. The positioning method further includes providing an indication that the parked vehicle is in the enclosed space if the error signal is at or above the threshold variation level.

In a further non-limiting embodiment of any of the foregoing positioning methods, the positioning method includes providing an indication that the parked vehicle is in an open space if an error signal between the plurality of expected temperatures and the plurality of actual temperatures is less than a threshold value. The positioning method further includes providing an indication that the parked vehicle is in the enclosed space if the error signal is at or above the threshold value.

In a further non-limiting embodiment of any of the foregoing positioning methods, the positioning method includes providing an indication that the parked vehicle is in an open space if a correlation coefficient between the plurality of expected temperatures and the plurality of actual temperatures is less than a threshold correlation value. The positioning method further includes providing an indication that the parked vehicle is in the enclosed space if the correlation coefficient is at or above the threshold correlation value.

In a further non-limiting embodiment of any of the foregoing positioning methods, the open space is an area outside a garage or in a garage with a garage door in an open position.

In a further non-limiting embodiment of any of the foregoing positioning methods, the open space is an area that is acceptable for starting an internal combustion engine, and the enclosed space is an area that is unacceptable for starting the internal combustion engine.

In a further non-limiting embodiment of any of the foregoing positioning methods, the method further comprises using the electrified vehicle charging system to compare lighting adjacent the parked vehicle to a weather condition received from a weather station to determine whether the parked vehicle is in an open space or an enclosed space.

In a further non-limiting embodiment of any of the foregoing positioning methods, the positioning method includes providing an indication that the vehicle is in an enclosed space if the lighting adjacent the parked vehicle is less than an expected lighting level that is based on the weather condition.

An electrified vehicle charging system according to another exemplary aspect of the present disclosure includes, among other things, a controller configured to compare at least one expected temperature outside a parked vehicle to at least one actual temperature outside the parked vehicle to determine whether the parked vehicle is in an open space or an enclosed space, a receiver that communicates with a weather station to collect the at least one expected temperature, and a temperature sensor that senses the at least one actual temperature.

In a further non-limiting embodiment of the foregoing system, the receiver and the temperature sensor are mounted to the parked vehicle.

In a further non-limiting embodiment of any of the foregoing systems, the at least one expected temperature is associated with a location of the parked vehicle.

In a further non-limiting embodiment of any of the foregoing systems, a lighting sensor mounted to the parked vehicle, the controller configured to provide an indication that the vehicle is in the enclosed space if a lighting reading from the lighting sensor is less than an expected lighting level that is based on a weather condition from the weather station.

In a further non-limiting embodiment of any of the foregoing systems, the controller is configured to provide an indication that the parked vehicle is in open space if an error signal between a first frequency spectrum of the at least one expected temperatures and a second frequency spectrum of the at least one actual temperature varies less than a threshold variation level, and an indication that the parked vehicle is in the enclosed space if the error signal is at or above the threshold variation level.

In a further non-limiting embodiment of any of the foregoing systems, the controller is configured to provide an indication that the parked vehicle is in an open space if an error signal between the at least one expected temperature and the at least one actual temperature is less than a threshold value, and an indication that the parked vehicle is in the enclosed space if the error signal is at or above the threshold value.

In a further non-limiting embodiment of any of the foregoing systems, the controller is configured to provide an indication that the parked vehicle is in an open space if a correlation coefficient between the at least one expected temperatures and the at least one actual temperatures is less than a threshold correlation value, and an indication that the parked vehicle is in the enclosed space if the correlation coefficient is at or above the threshold correlation value.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to determining whether or not a vehicle is in an enclosed space. If the vehicle is in an enclosed space, autonomous starting or remote starting of an internal combustion engine is typically avoided. Starting and operating the engine within an enclosed space is often undesirable. Exhausted gases, for example, can build up within the enclosed space.

Figure 1:
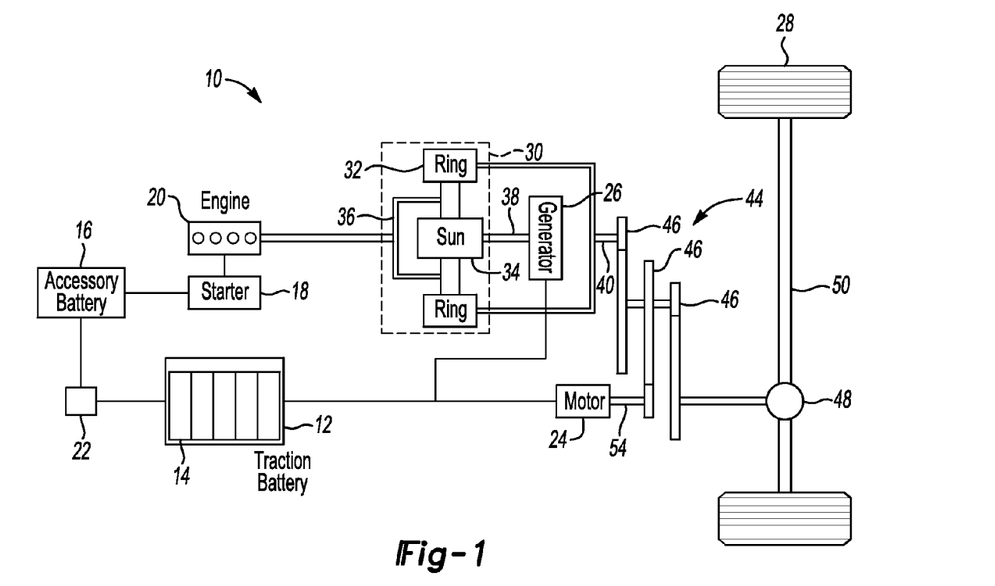
FIG. 1 illustrates a highly schematic view of an example powertrain for a hybrid electric vehicle.

Referring to FIG. 1, a powertrain 10 of a hybrid electric vehicle (HEV) includes a traction battery 12 having a plurality of battery cells 14. The HEV is a type of electrified vehicle.

The powertrain 10 includes an accessory battery 16 and a starter 18. Power from the accessory battery 16 can power the starter 18 to crank or start an internal combustion engine 20 of the powertrain 10. The traction battery 12 can charge the accessory battery 16 through a convertor 22.

The accessory battery 16 is a 12 Volt battery in this example used for starting, lighting and ignition. The traction battery 12 is a high-voltage battery when compared to the accessory battery 16.

The powertrain 10 further includes a motor 24 and a generator 26. The motor 24 and the generator 26 are types of electric machines. The motor 24 and generator 26 may be separate or have the form of a combined motor-generator.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 26. The second drive system includes at least the motor 24, the generator 26, and the traction battery 12. The motor 24 and the generator 26 are portions of an electric drive system of the powertrain 10.

The engine 20 and the generator 26 can be connected through a power transfer unit 30, such as a planetary gear set. Other types of power transfer units, including other gear sets and transmissions, can be used to connect the engine 20 to the generator 26. In one non-limiting embodiment, the power transfer unit 30 is a planetary gear set that includes a ring gear 32, a sun gear 34, and a carrier assembly 36.

The generator 26 can be driven by the engine 20 through the power transfer unit 30 to convert kinetic energy to electrical energy. The generator 26 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 24 can be selectively employed to drive the vehicle drive wheels 28 by outputting torque to a shaft 54 that is also connected to the second power transfer unit 44. In this embodiment, the motor 24 and the generator 26 cooperate as part of a regenerative braking system in which both the motor 24 and the generator 26 can be employed as motors to output torque. For example, the motor 24 and the generator 26 can each output electrical power to recharge cells 14 of the traction battery 12.

Figure 2:
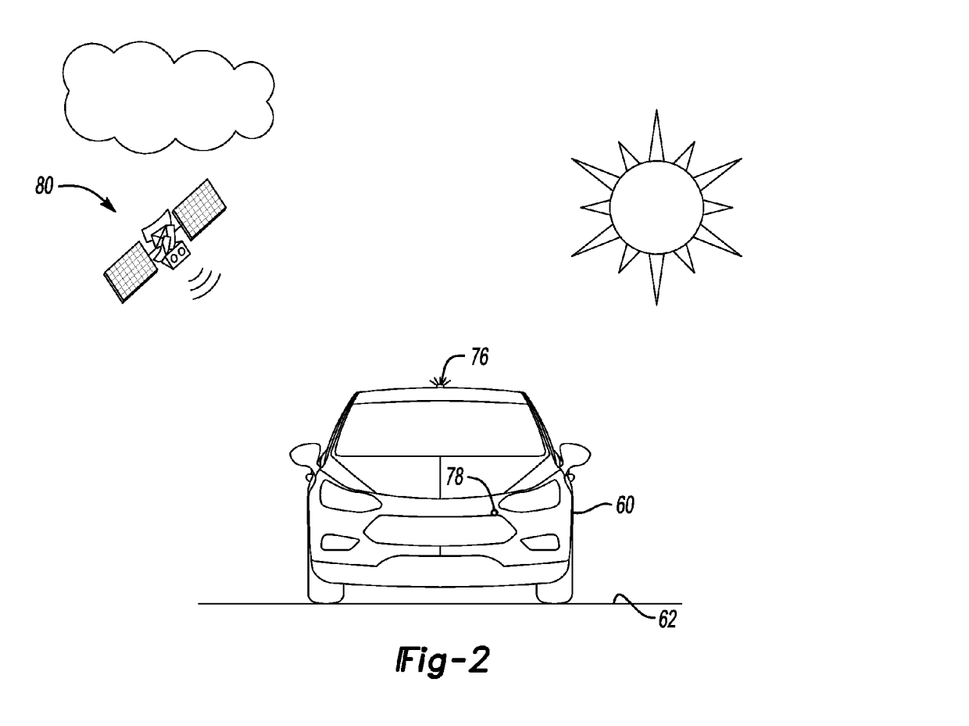
FIG. 2 illustrates a vehicle having the powertrain of FIG. 1 and in an open space.
Figure 3:
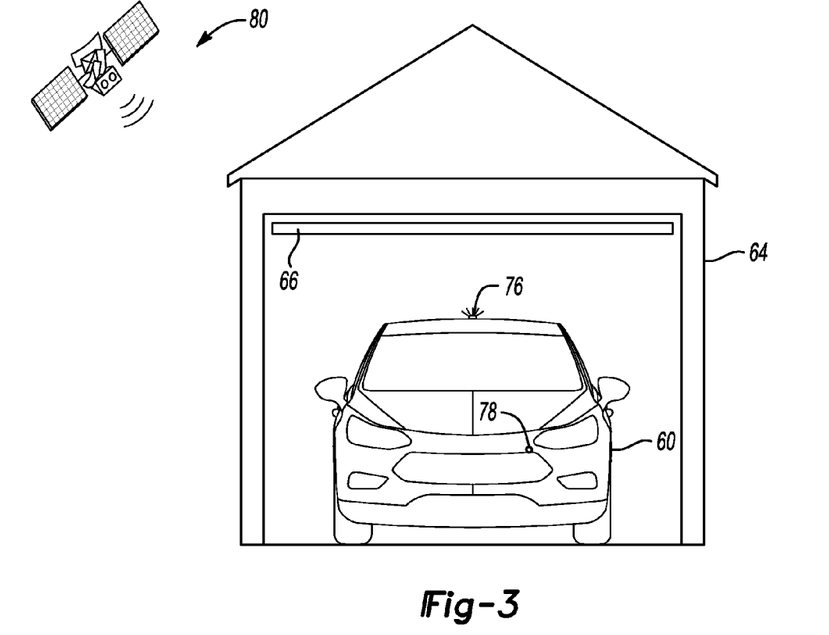
FIG. 3 illustrates the vehicle of FIG. 2 in another open space.
Figure 4:
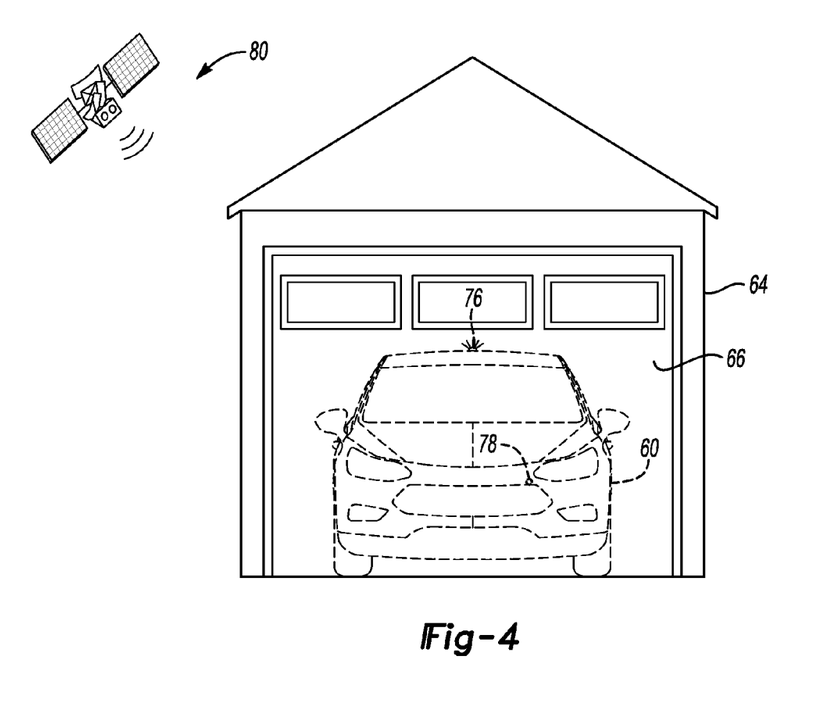
FIG. 4 illustrates the vehicle of FIG. 2 in an enclosed space.

Referring now to FIGS. 2 to 4 with reference to FIG. 1, an example HEV vehicle 60 includes the powertrain 10. In FIG. 2, the vehicle 60 is parked outside on a parking lot 62. In FIG. 3, the vehicle 60 is parked in a garage 64 with a garage door 66 that is in an open position. In FIG. 4, the vehicle 60 is parked in the garage 64 with the garage door 66 in closed position. In FIGS. 2 and 3, the vehicle 60 is in an open space. In FIG. 4, the vehicle 60 is in an enclosed space.

For purposes of this disclosure, the vehicle 60 is considered to be within an enclosed space when the vehicle 60 is enclosed within a structure. The vehicle 60 is in an open space when an area around the vehicle 60 has sufficient air circulation with atmosphere.

In FIG. 3, the vehicle 60 is not in an enclosed space because the garage door 66 is in the open position. Open spaces are generally considered to be acceptable areas for operating the engine 20. Enclosed spaces are generally considered to be unacceptable areas for operating the engine 20. Exhausted gases, for example, from operating the engine 20 can build up in enclosed spaces. For purposes of this disclosure, the open space is a space where the engine 20 can be started, and the enclosed space is a space where autonomously and remote starting of the engine 20 should be avoided.

Figure 5:
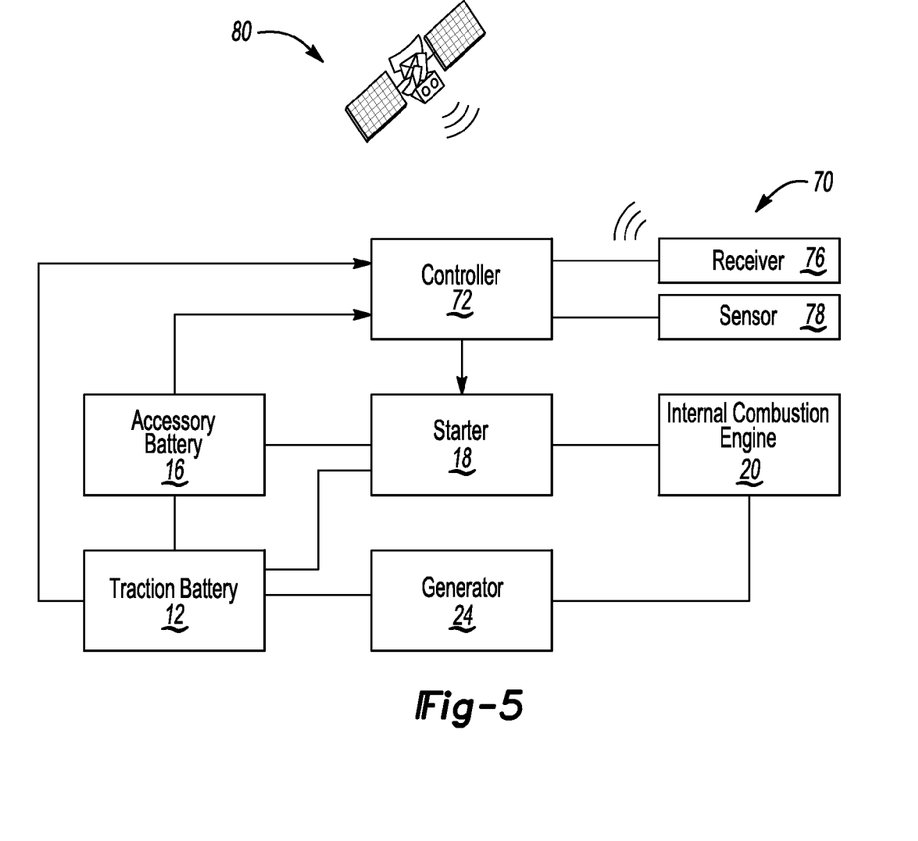
FIG. 5 illustrates a schematic view of a control system for the hybrid electric vehicle incorporating the powertrain system of FIG. 1.

Referring now to FIG. 5, within continuing reference to FIGS. 2 to 4, an example charging system 70 is utilized in connection with the vehicle 60. When the vehicle 60 is parked during a non-drive cycle, the charging system 70 maintains the battery 12 with enough charge to start the engine 20. In this example, power from the battery 12 is used to charge the accessory battery 16, which then powers the starter 18. In another example, the starter 18 is powered with power from the battery 12 without the power moving to the accessory battery 16. In this example, the accessory battery 16 requires some power to control closing of the contractors when starting the vehicle.

The system 70 includes a controller 72, the traction battery 12, the accessory battery 16, the starter 18, and the engine 20. The accessory battery 16, in this example, typically powers the starter 18 to crank the engine 20 when starting the engine 20.

The example controller 72 includes at least a memory portion, processing portion, and an internal timer. The controller 72 receives state of charge information from both the accessory battery 16 and the traction battery 12. In another example, the controller 72 receives state of charge information from only the accessory battery 16 or only the traction battery 12.

The example processor is operatively linked to a memory portion and the internal timer. The processor can be programmed to execute a program stored in the memory portion. The program can be stored in the memory portion as software code.

The program stored in the memory portion can include one or more additional or separate programs, each of which includes an ordered listing of executable instructions for implementing logical functions associated with an electrified vehicle charging method as will be described below.

At the conclusion of a drive cycle, the vehicle 60 is parked and keyed off. This begins a non-drive cycle for the vehicle 60.

During a non-drive cycle, the state of charge in the traction battery 12 and the state of charge in the accessory battery 16 can decrease over time. For example, if the traction battery 12 is a 25 Ah battery with a 15% state of charge at the conclusion of a drive cycle, the state of charge for the battery 12 could drop to 5% during the subsequent non-drive cycle. The drop could be due to self-discharge of the battery 12 when the vehicle 60 is parked for an extended period of time.

During the non-drive cycle, the controller 72 periodically wakes up and reassesses the state of charge for the traction battery 12 and the state of charge for the accessory battery 16. The controller 72 can rely on the internal timer to assess when to wake. In another example, the controller 72 wakes up aperiodically. That is the time between wake-ups can vary. The timing of the wake-ups could be based on temperatures of one or both of the batteries 12 and 16, or the voltages of the batteries 12 and 16.

During the non-drive cycle, the controller 72, after receiving state of charge information for the traction battery 12 and the state of charge information for the accessory battery 16 compares the states of charge to threshold states of charge. The memory portion can store the threshold states of charge, for example.

If the state of charge for the accessory battery 16 is below the threshold, and the state of charge for the traction battery 12 is below the threshold, the controller 72 can start the engine 20 to charge the traction battery 12. Since the controller 72 can start the engine 20 without responding to a user input, the starting is considered an autonomous starting of the engine 20.

Notably, the controller 72 verifies that the vehicle 60 is in an area appropriate for starting the engine 20 prior to starting the engine 20. In this example, the controller 72 executes a program to assess whether the vehicle 60 is in the enclosed space or the open space.

If the vehicle 60 is in the open space, the engine 20 drives the generator 26 to generate power for charging the traction battery 12. Power from the traction battery 12 can be used to charge the accessory battery 16 so that the starter 18 can crank the engine 20.

The charging brings the state of charge in the battery 12 to or above the threshold state of charge. After the charging, the controller 72 shuts off the engine 20 and sleeps for some time period. The controller 72 then wakes up and reassesses the states of charge in the batteries 12 and 16.

When an operator returns to the vehicle 60 to begin another drive cycle, the engine 20 can be cranked because the controller 72, during the non-drive cycle, has maintained the states of charge in the batteries 12 and 16 at or above the threshold values.

As mentioned above, the controller 72 verifies that the vehicle 60 is in an area appropriate for starting the engine 20 prior to starting the engine 20. In some situations, an autonomous start of the engine 20 is not desired. For example, the vehicle 60 may be parked in the enclosed space where exhausted gases associated with operating the engine 20 are not desired. If the vehicle 60 is in the open space rather than the enclosed space, the controller 72 initiates the autonomous start of the engine 20. If the vehicle 60 is in the enclosed space, the controller 72 avoids starting the engine 20.

The system 70 compares temperatures to determine whether the vehicle 60 is in the enclosed space or the open space. In this example, the controller 72 is operably coupled to a receiver 76 and a sensor 78.

The receiver 76 can receive temperature information communicated through a GPS satellite 80. A weather station can provide the temperature information. Other examples can include providing the temperature information for the area to the receiver 76 from weather.com, a local weather broadcast, or another internet accessible media.

The temperature information is an expected temperature for an area around the vehicle 60 if the vehicle 60 is in an open space. The expected temperature could be based on GPS coordinates of the vehicle 60. For example, if the vehicle 60 is in a particular city, the satellite 80 communicates outside air temperature information for that city to the vehicle 60. A person having skill in this art and the benefit of this disclosure would understand how to obtain expected temperatures for a particular location using, for example, a weather station, a GPS satellite, or both.

The sensor 78 provides the controller 72 with actual temperatures outside the vehicle. The sensor 78 can be mounted to the vehicle 60 and configured to monitor actual temperatures surrounding the vehicle 60.

The actual and estimated temperature measurements can be taken at the same time so that the measurements are synchronized. Synchronization can be made by asking vehicle controller to follow that of a GPS time stamp.

The controller 72 compares the expected temperatures outside the vehicle 60 to the actual temperatures outside the vehicle 60 to determine whether the vehicle 60 is in an open space or in an enclosed space. If the vehicle 60 is within the enclosed space, the controller 72 avoids autonomously starting the engine 20.

Generally, if the vehicle 60 is in an open space, the expected temperature and actual temperatures will track each other. However, if the vehicle 60 is in an enclosed space, the expected temperature and the actual temperature may not track each other. The enclosed space can be insulated from the surrounding areas, which can cause the expected temperature and actual temperatures to differ. The enclosed space could also have its temperature regulated, by an HVAC system for example, which could cause the expected temperatures and actual temperatures to differ.

Figure 6:
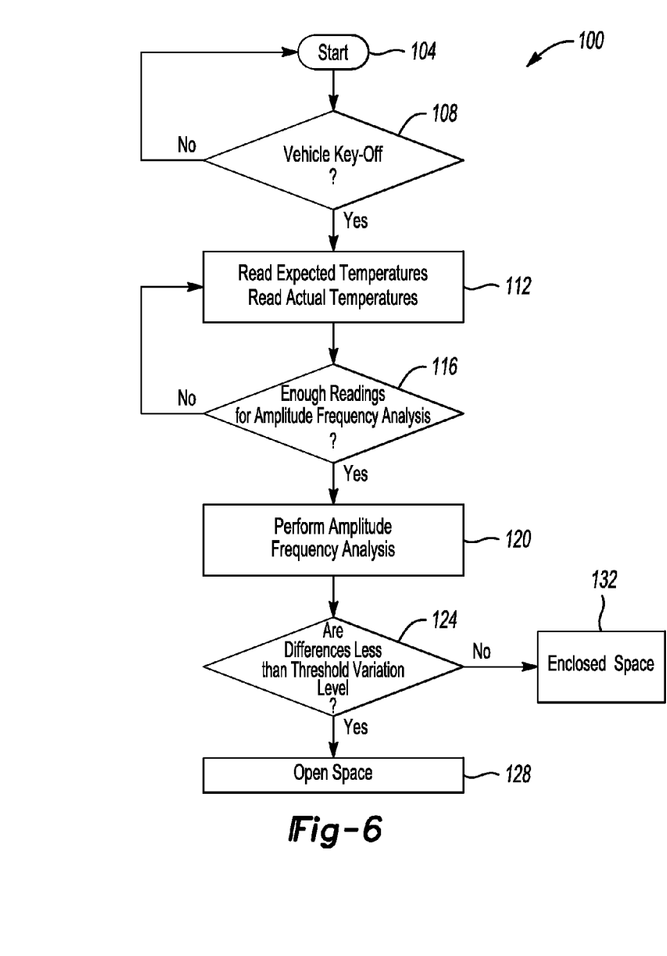
FIG. 6 illustrates the flow of an example method for charging an electrified vehicle having the powertrain system of FIG. 1.

Referring now to FIG. 6 with continuing reference to FIGS. 2 to 5, an example method 100 used by the controller 72 comparing expected temperatures to actual temperatures using signal frequency response spectrum analysis. The comparison enables the method 100 to assess whether the vehicle 60 is in an open space or an enclosed space. The method 100 begins at a start step 104 and moves to a step 108 to assess whether or not the vehicle 60 has been keyed off. If the vehicle 60 has not been key-off, the method 100 returns to the start 104. If yes, the method 100 considers the vehicle 60 to be parked and moves to the step 112.

At the step 112, the method 100 reads the expected temperatures from the weather station that are obtained through the receiver 76 and the actual temperatures obtained by the sensor 78. The expected temperatures could be obtained by using a GPS positioner on-board the vehicle 60. The GPS positioner could determine the location of the vehicle 60 as part of the key-off cycle for the vehicle 60. The receiver 76 then retrieves temperature information for that location to provide the expected temperature.

The controller 72 may populate a database with expected temperatures and actual temperatures read at intervals over a set time period. The intervals could be every hour and the time period could be twenty-four hours, for example. After the twenty-four hours, the database would be populated with twenty-four expected temperatures and twenty-four actual temperatures.

The controller 72 can associate the expected temperatures and actual temperatures with time stamps to ensure that expected temperatures and actual temperatures are taken at the same times.

In some examples, the weather station updates an expected temperature for a given area at set intervals, say every fifteen minutes. The controller 72 times its wake ups to synchronize with the updates from the weather station.

If the expected temperatures and actual temperatures were not taken at the same times, resampling the expected temperatures, the actual temperatures, or both can be required. Resampling, or recollecting the temperature information ensures that the expected temperatures and actual temperatures are collected at the same times.

The method 100 next moves from the step 112 to a step 116. At the step 116, the method 100 determines if enough readings of expected temperatures and actual temperatures are available for frequency spectrum analysis. If not, the method returns to the step 112 to collect additional expected temperatures and actual temperatures. If yes, the method 100 moves from the step 116 to a step 120.

The amount of readings considered appropriate for frequency spectrum analysis can vary. In this example, twenty-four expected temperature readings and twenty-four actual temperature readings at one hour intervals are considered sufficient for frequency spectrum analysis. The method 100 can vary the amount of readings, the intervals required, and the overall time period. Increasing one or more of these and other variables can increase confidence in the frequency spectrum analysis.

At the step 120, the method 100 performs frequency spectrum analysis of a difference between the expected temperature and actual temperature for each of the one-hour intervals.

The method 100 then moves from the step 120 to a step 124. At the step 124, the method 100 assesses whether the differences from the frequency spectrum analysis at the step 120 are less than a threshold variation level. If yes, the method 100 provides an indication at a step 128 that the vehicle is within an open space. If the error signal is not less than the threshold variation level, the method 100 provides an indication at a step 132 that the vehicle is within an enclosed space.

The decision logic at the step 124 can include a delta value to stop frequent switching between the step 128 and the step 132. For example, after comparing amplitude at various frequency points, if the difference is less than a first threshold value, then the object is considered within an open space. If the difference is greater than the first threshold and the delta value, the object is considered within an enclosed space. Otherwise, the step 124 continues with its existing initial decision of the step 128 or the step 132. The delta value technique could be understood by a person having skill in this art and the benefit of this disclosure.

As can be appreciated, if the vehicle 60 is in the open space, differences between the expected temperatures and the actual temperatures will have a flat, close to zero amplitude frequency since the vehicle measured temperature will track outside temperature due to unrestricted heat exchange. On the other hand, if the vehicle 60 is in an enclosed space, differences between the expected temperatures and the actual temperatures will have significant value if the expected temperatures are changing over time due to the restriction of heat exchange between the areas within the enclosed space the areas outside the enclosed space. Thus, if expected temperatures, from the weather station, are changing over time, and the differences between the expected temperatures and actual temperatures at the different times are less than a threshold variation level, the vehicle 60 is considered to be in the open space. Otherwise, the vehicle 60 is considered to be in the enclosed space.

The threshold variation level 124 can be calibrated and adjustable. As can be appreciated, relatively high error signals indicate high levels of variation between the expected temperature readings and the actual temperature readings, which are interpreted by the method 100 as the vehicle being within an enclosed space.

In response to the step 124, the controller 72 provides an indication that the vehicle 60 is in open space if an error signal between a first frequency spectrum of the plurality of expected temperatures and a second frequency spectrum of the plurality of actual temperatures varies less than a threshold variation level. This indication could include permitting an autonomous start of the vehicle 60.

In response to the step 124, the controller 72 provides an indication that the vehicle 60 is in the enclosed space if the error signal is at or above the threshold variation level. This indication could include preventing an autonomous start of the vehicle 60.

In some examples, the controller 72 includes a transmitter that sends a notification to an operator regarding the vehicle 60 that an autonomous start has been permitted or prevented.

In some examples, the vehicle 60 can be further assessed using differences in temporal temperatures. As explained in connection with the method 100, if the vehicle 60 is in the open space, a temperature error signal between the expected temperatures and the actual temperatures will be flat and have close to zero error after a set time. The set time could be a calibrated time, say two or three hours. Thus, the method 100 can, in some examples check only a tail portion of the temperature error signal to determine if the vehicle 60 is in the enclosed space or in the open space.

In response to the error signal analysis, the controller 72 can provide an indication that the vehicle 60 is in the open space if the error signal between the plurality of expected temperatures and the plurality of actual temperatures is less than a threshold value. This indication could include permitting an autonomous start of the vehicle 60.

In response to the error signal analysis, the controller 72 can provides an indication that the vehicle 60 is in the enclosed space if the error signal is at or above the threshold variation level. This indication could include preventing an autonomous start of the vehicle 60.

In some examples, the controller 72 includes a transmitter that sends a notification to an operator regarding the vehicle 60 that an autonomous start has been permitted or prevented.

Figure 7:
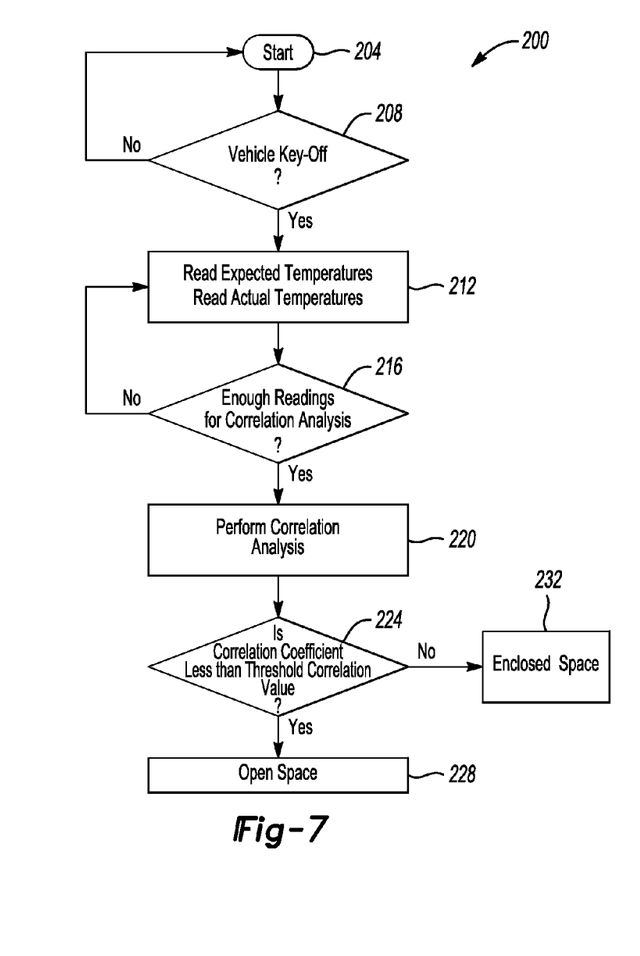
FIG. 7 illustrates the flow of another example method for charging an electrified vehicle having the powertrain system of FIG. 1.

Referring now to FIG. 7 with continuing reference to FIGS. 2 to 5, another example method 200 of comparing expected temperatures to actual temperatures uses correlation analysis to determine whether the vehicle 60 is in the enclosed space or the open space. For example, correlation analysis can determine a sample correlation coefficient that is used to estimate a Pearson correlation between the expected temperature and actual temperatures stored in the memory portion of the controller 72.

The method 200 begins at a start 204 and then moves to a step 208, which assesses whether or not the vehicle 60 is keyed off. If the vehicle 60 is not keyed off, the method 200 returns to the start 204. If yes, the method 200 considers the vehicle 60 to be parked and moves to the step 212.

If the vehicle 60 is keyed off, the method 200 moves from the step 208 to a step 212, which reads the expected temperatures and actual temperatures. The controller 72 can collect the expected and actual temperatures over a time period as described in connection with the method 100 of FIG. 6.

The method 200 then moves from the step 212 to the step 216, which assesses whether enough readings have been collected to perform correlation analysis. The amount of readings sufficient for correlation analysis can vary. As can be appreciated, increased number of readings results in a higher confidence in the correlation analysis. If enough readings have not been collected, the method 200 moves from the step 216 to the step 212 to collect additional expected temperatures and actual temperatures.

If enough readings are stored for correlation analysis, the method 200 moves to the step 220, which performs the correlation analysis. The correlation analysis provides a correlation coefficient between the expected temperature readings and the actual temperature readings collected in the step 212.

The method 200 then moves to the step 224, which determines whether the correlation coefficient is less than a threshold correlation value. If the correlation coefficient is less than the threshold correlation value, the method 200 provides an indication that the vehicle is in an open space at the step 228. This indication could include permitting an autonomous start of the vehicle 60.

If the correlation coefficient is not less than the threshold correlation value, the method 200 provides an indication that the vehicle is in an enclosed space at the step 232. This indication could include preventing an autonomous start of the vehicle 60. A delta value can be incorporated into the decision at the step 224 to avoid frequent switching between the step 232 and the step 228.

In some examples, the controller 72 includes a transmitter that sends a notification to an operator regarding the vehicle 60 that an autonomous start has been permitted or prevented.

Expected temperatures that correlate well with actual temperatures indicate that the vehicle 60 is within the open space as the enclosed space has not influenced the actual temperatures relative to the expected temperatures. The vehicle 60, when in the enclosed space, may read actual temperatures that are much higher than the temperatures outside the garage. For example, on a day where the expected temperature for a particular area ranges from 90 degrees to 100 degrees, the actual temperature collected by the sensor 78 can increase from 90 degrees to 120 degrees. The actual temperature readings from the sensor 72 thus do not correlate well with the expected temperature readings, and the method 200 interprets this lack of correlation as the vehicle residing within the enclosed space.

The method 100 of FIG. 6 using frequency spectrum analysis and the method 200 of FIG. 7 using correlation analysis may be used by the controller 72 alone or together. That is, the controller 72 may perform frequency spectrum analysis, temporal temperature analysis, and correlation analysis, or some combination of these. If the methods 100 and 200 all indicate that the vehicle 60 is in an enclosed space, the confidence in the vehicle 60 residing within the enclosed space is increased.

In some examples, the method 100 or the method 200 may further include a step of comparing an actual lighting condition for an area surrounding the vehicle to an expected lighting condition for the area surrounding the vehicle. For example, the vehicle can include a lighting sensor that, with the controller 72, detects illumination levels corresponding to areas adjacent the vehicle 60.

The controller 72 utilizes weather conditions received from the weather station through the satellite 80 to assess whether the illumination levels provided to the controller 72 by the lighting sensor correspond to expected illumination levels. If, for example, the weather conditions provided to the controller 72 indicate that the vehicle 60 is parked during a sunny day, yet the lighting sensor provides information to the controller 72 that the illumination level for the area surrounding the vehicle 60 is very low, the methods 100 or 200 may utilize this discrepancy as a further indication that the vehicle 60 resides in an enclosed space. The garage 64, for example, may have less light on a sunny day than the open space outside the garage 64.

If the vehicle 60 is parked in an open space, the lighting level provided by the lighting sensor to the controller 72 should closely match the weather conditions for the parked vehicle.

In some other examples, the method 100 or the method 200 can include a step of assessing whether a video signal or cellular signal received by the vehicle 60 is particularly weak or less than a magnitude threshold. The controller 72 can interpret a weak or nonexistent video or cellular signal as an indication that the vehicle 60 is in an enclosed space, e.g. underground parking place. In such examples, the controller 72 may not be able to obtain a communication signal that reveals the GPS position and external temperature for the vehicle 60.

Features of some of the exemplary embodiments disclosed above include autonomously charging an electrified vehicle to avoid insufficient charge to crank an internal combustion engine, which can lead to non-starts. The autonomous charging does not occur, however, if the electrified vehicle is in an enclosed space. The methods described herein can assess whether the vehicle is in an enclosed space or an open space using temperature information.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A positioning method for a parked electrified vehicle, comprising:
   during a non-drive cycle, using an electrified vehicle charging system to automatically prevent an autonomous start of an engine in the parked vehicle in response to a comparison between at least one expected temperature outside the parked vehicle and at least one actual temperature outside the parked vehicle indicating that the parked vehicle is in an enclosed space rather than an open space.

2. The positioning method of claim 1, further comprising the electrified vehicle charging system receiving the at least one expected temperature from a weather station, and receiving the at least one actual temperature from a temperature sensor.

3. The positioning method of claim 1, further comprising providing an indication that the parked vehicle is in the enclosed space if a signal having the at least one expected temperature is not received or has a signal strength below a threshold value.

4. The positioning method of claim 1, wherein the at least one expected temperature comprises a plurality of expected temperatures each taken at different times within a time period, and the at least one actual temperature comprises a plurality of actual temperatures each taken at different times with the time period.

5. The positioning method of claim 4, further comprising using a frequency spectrum analysis when comparing the plurality of expected temperatures to the plurality of actual temperatures.

6. The positioning method of claim 5, further comprising providing an indication that the parked vehicle is in the enclosed space if a frequency spectrum for the plurality of actual temperatures is varying differently than a frequency spectrum for the plurality of expected temperatures.

7. The positioning method of claim 5, further comprising providing an indication that the parked vehicle is in the open space if an error signal between a first frequency spectrum of the plurality of expected temperatures and a second frequency spectrum of the plurality of actual temperatures varies less than a threshold variation level, and an indication that the parked vehicle is in the enclosed space if the error signal is at or above the threshold variation level.

8. The positioning method of claim 4, further comprising providing an indication that the parked vehicle is in the open space if an error signal between the plurality of expected temperatures and the plurality of actual temperatures is less than a threshold value, and an indication that the parked vehicle is in the enclosed space if the error signal is at or above the threshold value.

9. The positioning method of claim 4, further comprising providing an indication that the parked vehicle is in the open space if a correlation coefficient between the plurality of expected temperatures and the plurality of actual temperatures is less than a threshold correlation value, and an indication that the parked vehicle is in the enclosed space if the correlation coefficient is at or above the threshold correlation value.

10. The positioning method of claim 1, wherein the open space is an area outside a garage or in the garage with a garage door in an open position.

11. The positioning method of claim 1, wherein the open space is an area that is acceptable for starting an internal combustion engine, and the enclosed space is an area that is unacceptable for starting the internal combustion engine.

12. The positioning method of claim 1, further comprising using the electrified vehicle charging system to compare detected lighting adjacent the parked vehicle with a light sensor and comparing the lighting to a weather condition received from a weather station to determine whether the parked vehicle is in the open space or the enclosed space.

13. The positioning method of claim 12, further comprising providing an indication that the vehicle is in the enclosed space if lighting adjacent the parked vehicle is less than an expected lighting level that is based on the weather condition.

14. An electrified vehicle charging system, comprising:
   a controller configured to compare at least one expected temperature outside a parked vehicle to at least one actual temperature outside the parked vehicle to determine whether the parked vehicle is in an open space or an enclosed space, and further configured to prevent an autonomous start of the parked vehicle if the parked vehicle is in the enclosed space;
   a receiver that communicates with a weather station to collect the at least one expected temperature; and
   a temperature sensor that senses the at least one actual temperature.

15. The system of claim 14, wherein the receiver and the temperature sensor are mounted to the parked vehicle.

16. The system of claim 14, wherein the at least one expected temperature is associated with a location of the parked vehicle.

17. The system of claim 14, wherein the controller is configured to provide an indication that the parked vehicle is in open space if an error signal between a first frequency spectrum of the at least one expected temperatures and a second frequency spectrum of the at least one actual temperature varies less than a threshold variation level, and an indication that the parked vehicle is in the enclosed space if the error signal is at or above the threshold variation level.

18. The system of claim 14, wherein the controller is configured to provide an indication that the parked vehicle is in the open space if an error signal between the at least one expected temperature and the at least one actual temperature is less than a threshold value, and an indication that the parked vehicle is in the enclosed space if the error signal is at or above the threshold value.

19. The system of claim 14, wherein the controller is configured to provide an indication that the parked vehicle is in the open space if a correlation coefficient between the at least one expected temperatures and the at least one actual temperatures is less than a threshold correlation value, and an indication that the parked vehicle is in the enclosed space if the correlation coefficient is at or above the threshold correlation value.

20. An electrified vehicle charging system, comprising:
- a controller configured to compare at least one expected temperature outside a parked vehicle to at least one actual temperature outside the parked vehicle to determine whether the parked vehicle is in an open space or an enclosed space;
- a receiver that communicates with a weather station to collect the at least one expected temperature;
- a temperature sensor that senses the at least one actual temperature; and
- a lighting sensor mounted to the parked vehicle, the controller further configured to provide an indication that the vehicle is in the enclosed space if a lighting reading from the lighting sensor is less than an expected lighting level that is based on a weather condition from the weather station.

* * * * *

UNITED STATES PATENT AND TRADEMARK OFFICE
CERTIFICATE OF CORRECTION

| | |
|---|---|
| PATENT NO. | : 9,679,486 B2 |
| APPLICATION NO. | : 14/919828 |
| DATED | : June 13, 2017 |
| INVENTOR(S) | : Yonghua Li and Hai Yu |

It is certified that error appears in the above-identified patent and that said Letters Patent is hereby corrected as shown below:

In the Claims

In Claim 4, Column 11, Line 53; before "the time period" replace "with" with --within--

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*